Oct. 20, 1936.    R. N. WILLIAMS    2,057,699
AIRPLANE AND PARACHUTE CONNECTING DEVICE
Filed Oct. 21, 1935
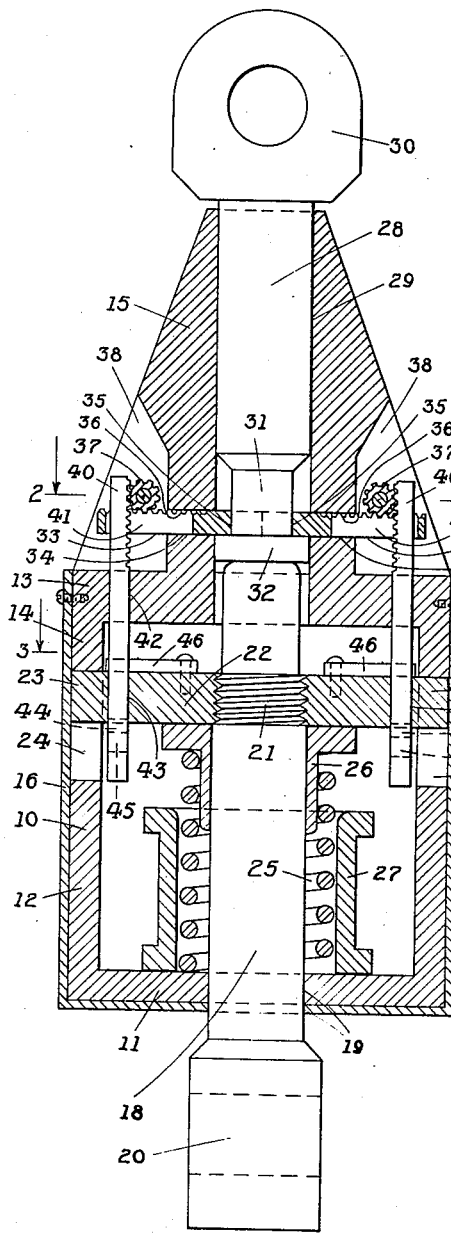
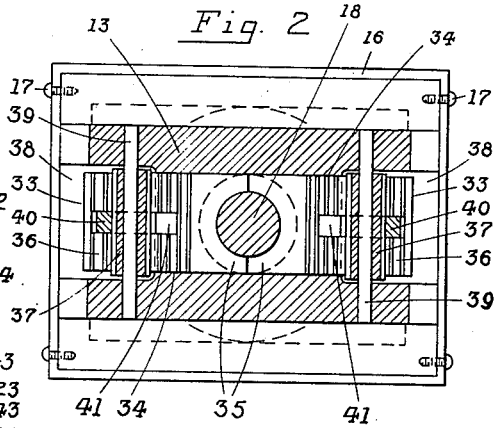
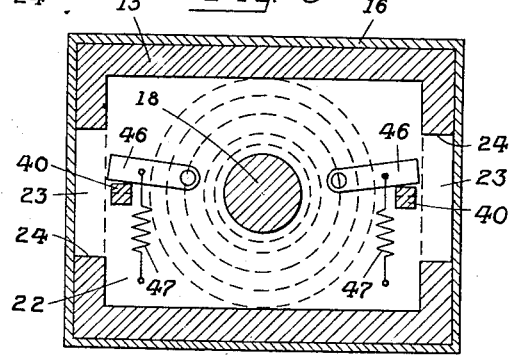
INVENTOR
RICHARD N. WILLIAMS
BY
ATTORNEY Patented Oct. 20, 1936

2,057,699

UNITED STATES PATENT OFFICE 2,057,699

AIRPLANE AND PARACHUTE CONNECTING DEVICE

Richard N. Williams, United States Navy

Application October 21, 1935, Serial No. 45,862

9 Claims. (Cl. 244—21)

(Granted under the act of March 3, 1883, as amended April 30, 1928; 370 O. G. 757)

The present invention relates to airplane and parachute connecting devices and it has a particular relation to devices for releasing the parachute when the airplane lands on the ground, such as that disclosed in applicant's Letters Patent of the United States, Number 1,845,466, granted February 16, 1932.

One of the objects of the present invention is the provision of a new and improved latch mechanism for positively connecting the parachute with the airplane during their descent but which will automatically release the same upon landing, so as to prevent the continuous motion of the parachute from overturning or dragging the airplane.

With these and other objects in view, as well as other advantages which may be incident to the use of the improvements, the invention consists of the parts and combinations thereof hereinafter set forth and claimed, with the understanding that the several necessary elements constituting the same may be varied in proportion and arrangement without departing from the nature and scope of the invention, as defined in the appended claims.

In order to make the invention more clearly understood there are shown in the accompanying drawing means for carrying the invention into practical effect, without limiting the improvements in their useful application to the particular construction, which, for purpose of explanation, have been made the subject of illustration.

In the accompanying drawing:

Fig. 1 is a vertical sectional view through a connecting device constructed in accordance with the invention;

Fig. 2 is a horizontal sectional view taken on line 2—2 of Fig. 1; and

Fig. 3 is a similar view taken on line 3—3 of Fig. 1.

Referring to the drawing, a releasable parachute and airplane connecting device, constructed in accordance with the present invention, is shown as comprising a two-part housing or frame which includes a hollow lower member 10 formed with a bottom 11 and side walls 12, and an upper member 13 formed with a depending peripheral flange 14, and a conical extension 15. The upper member 13 closes the upper end of the member 10 and is secured thereto by means of a metal shell 16 which completely encases the lower member 10, and which is secured to the upper member 13 by screws 17.

A vertically extending bolt 18 is slidably mounted in openings 19 provided in the member 10 and shell 16, and is formed with an eye 20 at its lower end for attachment to a suitable sling (not shown) fixed to the airplane. The bolt 18 passes upwardly through the lower member 10 and is also formed with a screw threaded portion 21 for threaded engagement with a transversely extending block or plate 22 which is mounted for vertical sliding movement in the lower member 10. The block 22 is provided with lugs 23 at opposite ends for sliding engagement with slots 24 formed in the walls 12, thus limiting the range of movement of the block and preventing the displacement thereof.

The block 23 is urged toward its upper position, shown in Fig. 1, by a coil spring 25 which surrounds the bolt 18 between the bottom 11 of the lower portion 10 and a flanged collar 26, which also surrounds the bolt 18 for abutting engagement with the lower surface of the block 23. A sleeve 27 surrounds the spring 25 and tends to prevent the same from buckling when subjected to compression.

A vertically extending rod or stem 28 is slidably mounted in a bore 29 provided in the upper member 13 in axial alignment with the bolt 18. This rod is formed at its upper end with an eye 30 for attachment to the shrouds (not shown) of a parachute, and at its lower end with a reduced portion or neck 31 defining a head or shoulder 32 of the same diameter as the rod 28, so as to easily pass through the bore 29 when the parts are disengaged, as will presently be described.

The rod 28 is releasably secured within the member 13 and hence to the bolt 18 by means of a pair of oppositely disposed latch members 33 which are slidably mounted for horizontal movement in guide openings 34 formed in the conical portion 15 of the upper member 13. Each of the latch members 33 is formed with an inner semicircular jaw portion 35 adapted to embrace the reduced neck 31 above the head or shoulder 32, and also with a rack 36 on its upper surface for intermeshing engagement with an elongated pinion 37. The pinions 37 are located in recesses 38 formed in opposite sides of the conical portion 15 and are journalled on shafts 39 which are mounted at their ends in said conical portion 15.

The pinions 37 also mesh with a pair of oppositely disposed vertically extending rack bars 40 which pass through slots 41 provided in the latch members 33, and are slidably mounted in guide openings 42 and 43 provided in the upper member 13 and block 23 respectively. By means of this construction vertical movement of the rack bars 40 will be translated through the pinions 37 into horizontal movement of the latch members 33. Notches 44, having inclined lower faces 45, are formed in the sides of the vertical rack bars 40 for engagement by dogs 46, which are pivotally mounted upon the upper surface of the block 23 and which are urged toward the rack bars 40 by springs 47, Fig. 3.

In operation, the rod 28 is inserted in the bore 29 as shown in Fig. 1. The rack bars 40 are then depressed manually so as to cause the latch members 33 to move inwardly and embrace the reduced portion 31 of the rod 28 above the head 32. With the parts in this position and with the eyes 20 and 30 suitably attached to an airplane and parachute respectively, let it be assumed that the pilot releases the parachute. When the released parachute opens and takes the load of the falling airplane the bolt 18 and block 20 will slide downwardly with respect to members 12 and 13 and rod 28, compressing the spring 25, until the dogs 46 register with the notches 44 in the rack bars 40 and engage the same under the action of the springs 47, thus locking the block 20 and rack bars 40 together so as to thereafter move in unison. As soon, however, as the airplane lands upon the ground the spring 25 expands and in so doing forces the block 22 and rack bars 40 upwardly, the inclined faces 45 forcing the dogs 46 out of the notches 44. This will rotate the pinions 37 in the reverse direction so as to retract the latch members 33 from locking engagement with the head 32 of the rod 28. This releases the still drifting parachute, which will withdraw the rod 28 from the bore 29, and float away without exerting any pull upon the airplane, such as might drag or overturn the same.

If the strain encountered when the parachute first opens is excessive, the downward movement of the block 22 will be arrested by the lugs 23 engaging the bottoms of the slots 24. In this position of the block 22 the dogs 46 will bear against the inclined portions 45 of the notches 44, so as to be guided into the notches 44 thereby when such excess strain is relieved during the normal descent of the parachute.

Various modifications and changes in proportions and arrangement of the hereinabove described parts may be made by those skilled in the art without departing from the spirit and scope of the invention, as defined in the appended claims.

The invention described herein may be manufactured by or for the Government of the United States of America for governmental purposes without the payment of any royalties thereon or therefor.

What is claimed is:

1. A device for releasably connecting a parachute with a descending object comprising a housing, yieldable means carried by said housing for attachment to the object, releasable means carried by said housing for attachment to the parachute, a latch member slidably mounted in said housing for engagement with said releasable means for maintaining the latter against displacement from said housing during the descent of said object, and means actuated by said yieldable means for retracting said latch member to release said releasable means and the parachute attached thereto when the downward motion of the descending object is arrested.

2. A device for releasably connecting a parachute with a descending object comprising a housing, yieldable means carried by said housing for attachment to the object, releasable means carried by said housing for attachment to the parachute, a latch member carried by said housing for engagement with said releasable means for maintaining the latter against displacement from said housing during the descent of said object, and rack and pinion means actuated by said yieldable means for retracting said latch member to release said releasable means and the parachute attached thereto when the downward motion of the descending object is arrested.

3. A device for releasably connecting a parachute with a descending object comprising a housing, yieldable means carried by said housing for attachment to the object, releasable means carried by said housing for attachment to the parachute, a latch member carried by said housing for engagement with said releasable means for maintaining the latter against displacement from said housing during the descent of said object, and means including transversely extending rack bars intermeshing with a common pinion actuated by said yieldable means for retracting said latch member to release said releasable means and the parachute attached thereto when the downward motion of the descending object is arrested.

4. A device for releasably connecting a parachute with a descending object comprising a housing, yieldable means carried by said housing for attachment to the object, releasable means carried by said housing for attachment to the parachute, a latch member carried by said housing for engagement with said releasable means for maintaining the latter against displacement from said housing during the descent of said object, a rack bar connected with said latch member, a pinion journalled in said housing and intermeshing with said rack bar, a second rack bar slidably mounted in said housing at right angles to said first mentioned rack bar and intermeshing with said pinion, and means connecting said last mentioned rack bar with said yieldable means whereby said rack bars and pinions will be actuated thereby to retract said latch member to release said releasable means and the parachute attached thereto when the downward motion of the descending object is arrested.

5. A device for releasably connecting a parachute with a descending object comprising a housing; a block slidably mounted in said housing for attachment with the object; a spring for yieldably supporting said block; a link releasably mounted in said housing for attachment with the parachute; a latch member carried by said housing for maintaining the latter against displacement from said housing during the descent of the object; actuating means for said latch member; and means operable when the parachute is opened and said block is moved downwardly against the action of said spring under the weight of the object, for connecting said latch actuating means with said block whereby, when the downward motion of the descending object is arrested upon landing and the weight supported by said plate is thus transferred, said spring will return said plate to its initial position and cause said latch actuating means to retract said latch member to release said link and the parachute attached thereto.

6. A device for releasably connecting a parachute with a descending object comprising a housing; a block slidably mounted in said housing for attachment with the object; a spring for yieldably supporting said block; a link releasably mounted in said housing for attachment with the parachute; a latch member slidably mounted in said housing for maintaining the latter against displacement from said housing during the descent of the object; actuating means for said latch member; and means operable when the parachute is opened and said block is moved downwardly against the action of said spring under the weight of the object, for connecting said latch actuating means with said block whereby, when the downward motion of the descending object is arrested upon landing and the weight supported by said plate is thus transferred, said spring will return said plate to its initial position and cause said latch actuating means to retract said latch member to release said link and the parachute attached thereto.

7. A device for releasably connecting a parachute with a descending object comprising a housing; a block slidably mounted in said housing for attachment with the object; a spring for yieldably supporting said block; a link releasably mounted in said housing for attachment with the parachute; a latch member carried by said housing for maintaining the latter against displacement from said housing during the descent of the object; rack and pinion means for actuating said latch member; and means operable when the parachute is opened and said block is moved downwardly against the action of said spring under the weight of the object, for connecting said rack and pinion means with said block whereby, when the downward motion of the descending object is arrested upon landing and the weight supported by said plate is thus transferred, said spring will return said plate to its initial position and cause said rack and pinion means to retract said latch member to release said link and the parachute attached thereto.

8. A device for releasably connecting a parachute with a descending object comprising a housing; a block slidably mounted in said housing for attachment with the object; a spring for yieldably supporting said block; a link releasably mounted in said housing for attachment with the parachute; a latch member carried by said housing for maintaining the latter against displacement from said housing during the descent of the object; actuating means for said latch member; and a dog movably mounted on said block and operable when the parachute is opened and said block is moved downwardly against the action of said spring under the weight of the object, for connecting said latch actuating means with said block whereby, when the downward motion of the descending object is arrested upon landing and the weight supported by said plate is thus transferred, said spring will return said plate to its initial position and cause said latch actuating means to retract said latch member to release said link and the parachute attached thereto.

9. A device for releasably connecting a parachute with a descending object comprising a housing; a block slidably mounted in said housing for attachment with the object; a spring for yieldably supporting said block; a link releasably mounted in said housing for attachment with the parachute; a latch member carried by said housing for maintaining the latter against displacement from said housing during the descent of the object; a rack bar for actuating said latch member; a pinion for actuating said rack bar; a second rack bar extending at right angles to said first mentioned rack bar for rotating said pinion; and means operable when the parachute is opened and said block is moved downwardly against the action of said spring under the weight of the object, for connecting said last mentioned rack bar with said block whereby, when the downward motion of the descending object is arrested upon landing and the weight supported by said plate is thus transferred, said spring will return said plate to its initial position and cause said last mentioned rack bar to rotate said pinion and cause said first mentioned rack bar to retract said latch member to release said link and the parachute attached thereto.

RICHARD N. WILLIAMS.